United States Patent
Chivukula

(10) Patent No.: US 12,210,115 B2
(45) Date of Patent: Jan. 28, 2025

(54) HIGH ISOLATION BETWEEN TRANSMIT AND RECEIVE ANTENNA IN FMCW RADARS

(71) Applicant: Honeywell International Inc., Charlotte, NC (US)

(72) Inventor: Rajesh Chivukula, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 274 days.

(21) Appl. No.: 17/813,625

(22) Filed: Jul. 20, 2022

(65) Prior Publication Data

US 2023/0314557 A1 Oct. 5, 2023

(30) Foreign Application Priority Data

Apr. 5, 2022 (IN) .............................. 202211020455

(51) Int. Cl.
*G01S 7/02* (2006.01)
*G01S 7/03* (2006.01)
*G01S 13/00* (2006.01)

(52) U.S. Cl.
CPC .............. *G01S 7/025* (2013.01); *G01S 7/038* (2013.01); *G01S 13/003* (2013.01)

(58) Field of Classification Search
CPC ......... G01S 7/025; G01S 7/038; G01S 13/003
USPC ....................................................... 342/188
See application file for complete search history.

(56) References Cited

U.S. PATENT DOCUMENTS

| | | | | |
|---|---|---|---|---|
| 4,323,899 A | * | 4/1982 | Barnes | G01S 7/024 342/362 |
| 5,659,322 A | * | 8/1997 | Caille | H01Q 21/245 342/188 |
| 6,278,409 B1 | * | 8/2001 | Zuta | G01S 13/933 343/705 |

(Continued)

FOREIGN PATENT DOCUMENTS

| WO | WO-2012093392 A1 | * | 7/2012 | ............. H01P 5/185 |
|---|---|---|---|---|
| WO | 2020117284 A1 | | 12/2018 | |

OTHER PUBLICATIONS

Response to Extended Search Report dated Aug. 28, 2023, from counterpart European Application No. 23162255.6 filed Jan. 3, 2024, 18 pp.

(Continued)

*Primary Examiner* — Nuzhat Pervin
(74) *Attorney, Agent, or Firm* — Shumaker & Sieffert, P.A.

(57) ABSTRACT

A frequency modulated continuous wave (FMCW) radar antenna that may provide isolation between the transmit (Tx) antenna and the receive (Rx) antenna based on the arrangement of the transmit elements and the receive elements. The transmit antenna elements for the antenna of this disclosure may be orthogonally fed, e.g., different by 90 degrees, compared to the receive antenna elements. For example, for horizontally polarized receive antenna elements, the transmit elements may be vertically polarized, or vice versa. The cross-polarized antenna elements may cause attenuation of surface waves between the Tx and Rx antennae. A low insertion loss 90-degree polarizer layer over one of the transmitter antenna, or the receiver antenna, to convert either the transmitted signals or the received reflections by 90-degrees so the reflected signal matches the polarization of the receiver antenna.

20 Claims, 12 Drawing Sheets

(56) References Cited

U.S. PATENT DOCUMENTS

| | | | | |
|---|---|---|---|---|
| 7,420,502 | B2* | 9/2008 | Hartzstein | H01Q 19/17 342/72 |
| 8,248,298 | B2* | 8/2012 | Lalezari | H01Q 21/24 342/120 |
| 8,264,398 | B2* | 9/2012 | Kamo | G01S 13/955 342/175 |
| 9,285,461 | B2* | 3/2016 | Swirhun | G01S 7/026 |
| 9,461,367 | B2* | 10/2016 | Romney | H01Q 25/007 |
| 9,568,600 | B2* | 2/2017 | Alland | G01S 7/2925 |
| 9,897,695 | B2* | 2/2018 | Vacanti | G01S 7/352 |
| 10,283,874 | B2* | 5/2019 | Tsuchiya | H01Q 21/065 |
| 10,297,923 | B2* | 5/2019 | Chen | H01Q 23/00 |
| 10,712,438 | B2* | 7/2020 | Vacanti | G01S 7/04 |
| 10,754,020 | B2* | 8/2020 | Holt | G01S 13/4472 |
| 10,756,417 | B2* | 8/2020 | Izadian | G01S 13/931 |
| 10,852,390 | B2* | 12/2020 | Izadian | G01S 7/41 |
| 11,031,682 | B2* | 6/2021 | Izadian | G01S 7/0231 |
| 11,296,416 | B2* | 4/2022 | Park | H01Q 15/148 |
| 11,532,869 | B2* | 12/2022 | Spalink | H01Q 21/08 |
| 11,644,533 | B2* | 5/2023 | Izadian | G01S 7/41 342/26 D |
| 11,658,378 | B2* | 5/2023 | Myers | H05K 1/0246 333/248 |
| 2006/0087385 | A1* | 4/2006 | Fitzpatrick | G01S 13/0209 333/117 |
| 2009/0028074 | A1* | 1/2009 | Knox | H01Q 9/0435 370/278 |
| 2009/0274072 | A1* | 11/2009 | Knox | H01Q 1/2225 343/702 |
| 2012/0188917 | A1* | 7/2012 | Knox | H01Q 1/2225 370/277 |
| 2016/0172766 | A1* | 6/2016 | Milroy | H01Q 15/244 343/756 |
| 2017/0104276 | A1* | 4/2017 | Vacanti | G01S 13/34 |
| 2017/0160389 | A1* | 6/2017 | Vacanti | H01Q 1/42 |
| 2017/0264014 | A1* | 9/2017 | Le-Ngoc | H01Q 21/065 |
| 2017/0346169 | A1* | 11/2017 | Wang | G01S 13/4463 |
| 2018/0156891 | A1* | 6/2018 | Brune | H01Q 1/3233 |
| 2018/0259641 | A1* | 9/2018 | Vacanti | G01S 13/953 |
| 2019/0056488 | A1* | 2/2019 | Vacanti | G01S 7/06 |
| 2019/0064338 | A1* | 2/2019 | Holt | H01Q 1/525 |
| 2019/0187247 | A1* | 6/2019 | Izadian | G01S 7/025 |
| 2019/0190133 | A1* | 6/2019 | Izadian | H01Q 13/20 |
| 2019/0341694 | A1* | 11/2019 | Zou | H01Q 21/0031 |
| 2020/0052391 | A1* | 2/2020 | Kampeas | H01Q 15/244 |
| 2020/0284883 | A1* | 9/2020 | Ferreira | H04N 25/773 |
| 2020/0309900 | A1* | 10/2020 | Brune | G01S 13/931 |
| 2020/0333452 | A1* | 10/2020 | Vacanti | G01S 13/44 |
| 2020/0341132 | A1* | 10/2020 | Holt | G01S 13/4463 |
| 2021/0288398 | A1* | 9/2021 | Sato | G01S 7/4026 |
| 2022/0077582 | A1* | 3/2022 | Wang | H01Q 1/243 |
| 2022/0109231 | A1* | 4/2022 | Haide | H04B 7/0413 |
| 2022/0173530 | A1* | 6/2022 | Ueda | H01Q 1/40 |
| 2024/0183937 | A1* | 6/2024 | Brune | H01Q 13/28 |

OTHER PUBLICATIONS

Extended Search Report from counterpart European Application No. 23162255.6 dated Aug. 28, 2023, 7 pp.

* cited by examiner

HIGH ISOLATION BETWEEN TRANSMIT AND RECEIVE ANTENNA IN FMCW RADARS

This application claims the benefit of Indian Provisional Patent Application No. 202211020455, filed on Apr. 5, 2022, the entire contents of which is incorporated herein by reference.

TECHNICAL FIELD

The disclosure relates to phased array radar devices.

BACKGROUND

Some examples of frequency modulated continuous wave (FMCW) radar systems may include a dedicated transmit antenna facing the same direction as a dedicated receive antenna. In contrast, a pulse radar system may use the same antenna for both transmit and receive, at different times. Isolation between transmit and receive antennas may be desirable for FMCW radars to improve the system performance, e.g., reduce interference and to provide receiver sensitivity to detect small or low reflection targets. In some examples, isolation features, such as electronic band gap (EBG) structures may be used to stop the propagation of surface waves from the transmit to receive antennae.

SUMMARY

In general, the disclosure describes a frequency modulated continuous wave (FMCW) radar antenna that may provide isolation between the transmit (Tx) antenna and the receive (Rx) antenna based on the arrangement of the transmit elements and the receive elements. The transmit antenna elements for the antenna of this disclosure orthogonally fed, e.g., different by 90 degrees compared to the receive antenna elements. For example, for horizontally polarized receive antenna elements, the transmit elements may be vertically polarized, or vice versa. The cross-polarized antenna elements may cause attenuation of surface waves between the Tx and Rx antennae. In some examples, the antenna of this disclosure may maintain isolation between the Tx and Rx antennae, but may reduce the size of the isolation area and therefore reduce the overall size of the antenna. Smaller antenna may be desirable for some applications, such as unmanned aerial vehicles (UAV) and other smaller vehicles.

The antenna of this disclosure may also include a polarizer layer on the either of the transmit antenna or the receive antenna. The receive antenna elements may be polarized in the same direction as the reflected radar signal, such that the received signal to the receiver circuitry is not attenuated. Therefore, a low insertion loss 90-degree polarizer layer over one of the transmitter antenna, or the receiver antenna, can convert either the transmitted or the received reflection by 90-degrees so the reflected signal matches the polarization of the receiver antenna. In some examples the insertion loss for the polarizer may be less than 1.0 dB, less than 0.5 dB and in some examples less than 0.25 dB. The polarizer may be implemented, for example, as printed circuit board or a printed circuit board layer. In this manner the transmitted and received signals are co-polarized but the surface waves between transmit and receive antennas, which may cause interference, are cross polarized.

In one example, this disclosure describes a frequency modulated continuous wave (FMCW) radar device comprising: a transmit antenna comprising: a plurality of transmit antenna elements aligned in a single column, wherein each element of the plurality of transmit elements is polarized in a first direction; a receive array antenna separate from the transmit antenna, comprising an array of receive elements, wherein the receive array antenna is configured to receive reflected FMCW signals transmitted by the transmit antenna from a target, wherein each element of the plurality of receive elements is polarized in a second direction orthogonal to the first direction; and a polarizer, located between the FMCW radar device and the target; electrically and mechanically connected to the FMCW radar device; and the polarizer configured to receive radar signals and output the received radar signals converted to an orthogonal polarization direction, wherein the orthogonal polarization direction is the same as one of the first direction or the second direction.

In another example, this disclosure describes a system comprising: signal processing circuitry comprising: a transmit antenna comprising: a plurality of transmit antenna elements aligned in a single column, wherein each element of the plurality of transmit elements is polarized in a first direction; a receive array antenna separate from the transmit antenna, comprising an array of receive elements, wherein the receive array antenna is configured to receive reflected FMCW signals transmitted by the transmit antenna from a target, wherein each element of the plurality of receive elements is polarized in a second direction orthogonal to the first direction; and a polarizer, located between the FMCW radar device and the target; electrically and mechanically connected to the FMCW radar device; and the polarizer configured to receive radar signals and output the received radar signals converted to an orthogonal polarization direction, wherein the orthogonal polarization direction is the same as one of the first direction or the second direction.

In another example, this disclosure describes a method comprising: generating, by transmitter electronics, a frequency modulated continuous wave (FMCW) radar signal; transmitting, by a transmit antenna operatively coupled to transmitter electronics, the FMCW radar signal, wherein the transmit antenna comprises a plurality of transmit antenna elements aligned in a single column, wherein each element of the plurality of transmit elements is polarized in a first direction; receiving, by a receive array antenna, reflected FMCW signals from a target, wherein the reflected FMCW signals were transmitted to the target by the transmit antenna, wherein the receive array antenna comprises a plurality of receive elements arranged in an array of receive elements, and wherein each element of the plurality of receive elements is polarized in a second direction orthogonal to the first direction; converting, by a polarizer, radar signals received by the polarizer to an orthogonal polarization direction; and outputting, by the polarizer, the received radar signals, wherein the orthogonal polarization direction is the same as one of the first direction or the second direction, and wherein the polarizer located between the FMCW radar device and the target.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
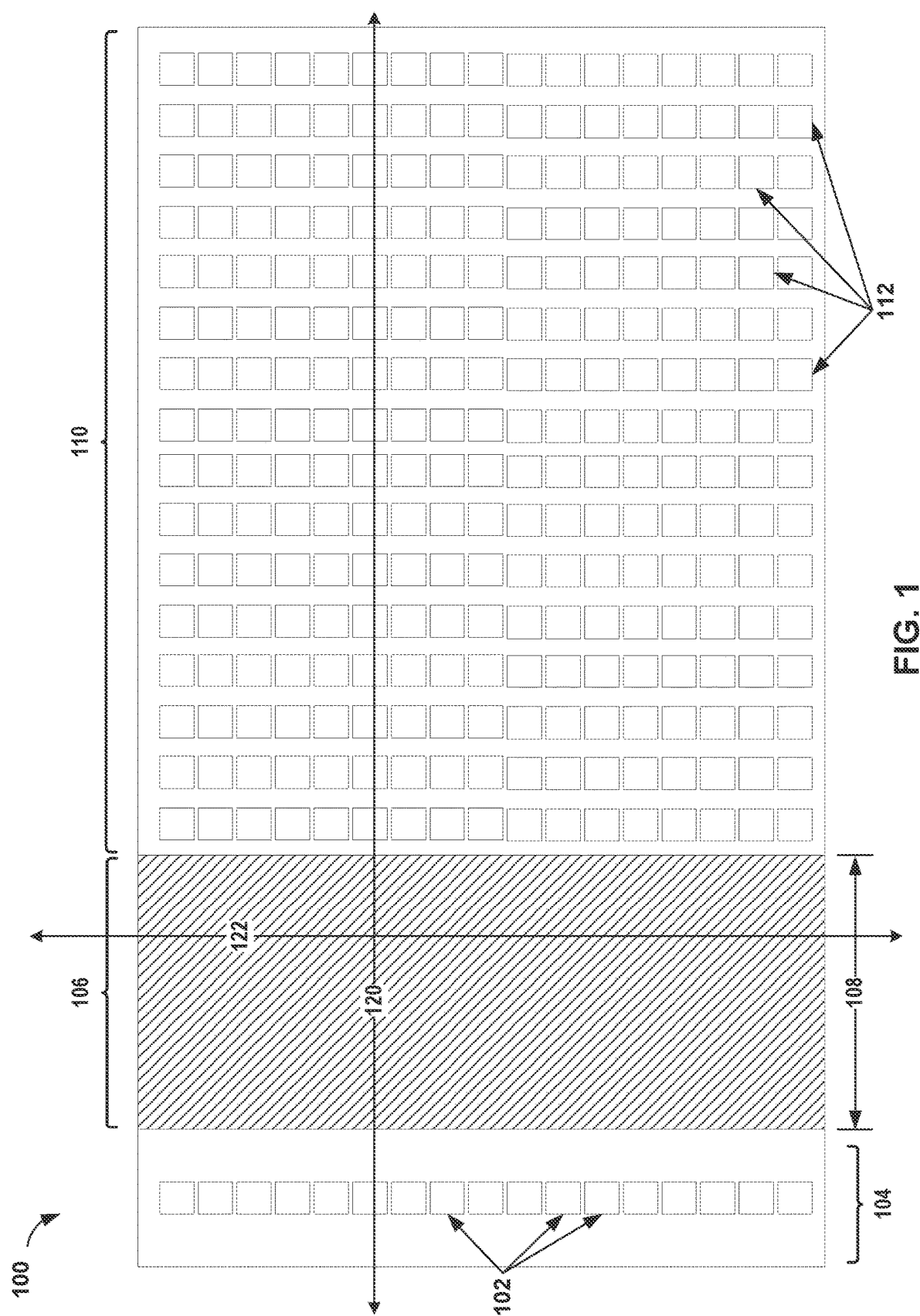
FIG. 1 is a conceptual diagram illustrating an example device that includes transmit elements that are orthogonal to the elements of the receive array.

FIG. 1 is a conceptual diagram illustrating an example device that includes transmit elements that are orthogonal to the elements of the receive array. Device 100, in the example of FIG. 1, includes transmit array 104, receive array 110 and an isolation area 106. In some examples device 100 may be configured to transmit and receive frequency modulated continuous wave (FMCW) radar signals, but the techniques of this disclosure may apply to other types of transmitted and received signals such as communication signals, wireless power transfer, and similar signals.

In the example of FIG. 1, transmit antenna 104 includes a plurality of transmit antenna elements 102 aligned in an array of a single column aligned along a first axis 122 of device 100. In other examples, not shown in FIG. 1, transmit antenna 104 may include two or more columns, also aligned along axis, or plane 122. Each transmit element 102 of the plurality of transmit elements of may be polarized in a selected direction. For example, each of transmit elements 102 may be polarized to align with axis 122 or each of transmit elements 102 may be polarized to align with axis 120. In other examples each of transmit elements 102 may be polarized to align with some other angle, e.g., relative to axis 122, such as at forty-five degrees, twenty degrees or some other angle (not shown in FIG. 1).

In some examples, transmit antenna 104 may be configured to output a high-aspect ratio transmit beam that covers an area of interest (AOI), also referred to as a field of regard. The high-aspect ratio transmit beam may have a long axis aligned with axis 120 and a short axis aligned with axis 122. In some examples the transmit beam may be a fixed transmit beam. In other examples, transmit electronics of device 100 may include circuitry (not shown in FIG. 1) to scan the transmit beam, e.g., along the short axis.

Receive array antenna 110, in the example of FIG. 1, is separate from transmit antenna 104, and includes an array of receive elements 112. In some examples, receive elements 112 may be subdivided into quadrants or other arrangements. In the example of a radar device, receive array antenna 110 may be configured to receive reflected signals, e.g., FMCW radar signals reflected from a target. The reflected FMCW radar signals in the example of device 100 may have been transmitted by transmit antenna 104.

Each element of the plurality of receive elements 112 may be polarized in a second direction orthogonal to the direction of transmit elements 102 of transmit antenna 104. In the example in which transmit elements 102 are polarized to align with axis 122, then receive elements 112 are polarized to align with axis 120 and vice versa. Similarly, for transmit antenna elements 102 polarized at some angle to, e.g., 45° axis 120, then receive elements 112 are polarized orthogonal to that angle, e.g., 135° to axis 120.

To ensure that transmit antenna 104 and receive array antenna 110 operate with co-polarized signals, device 100 also includes a vertical to horizontal polarizer (or vice versa) located between the device 100 and the target (not shown in FIG. 1). The polarizer may be a low insertion loss device (e.g., less than 0.5 dB or even 0.25 dB) configured to receive radar signals and output the received radar signals converted to an orthogonal polarization direction. The output orthogonal polarization direction is the same as either one of the polarization direction of the transmit elements 102 or the direction of the receive elements 112. The polarizer may be located either between the transmit antenna 104 and the target or between the target and the receive array antenna 110. In this manner, the transmit elements 102 and receive elements 112 are co-polarized with respect to the target, but the surface waves between transmit antenna 104 and receive array antenna 110 are cross polarized.

The cross-polarized antenna elements between transmit antenna 104 and receive antenna 110 may surface waves to be attenuated, for example by approximately 20-25 dB in some examples. Isolation area 106, which in some examples may be implemented as an electronic band gap (EBG) isolation area, is configured to isolate and prevent interference between the higher power transmit signals from transmit antenna 104 and the lower power reflected signals received at receive array antenna 110. The techniques of this disclosure, that include cross polarization at the surface, e.g., in the plane defined by axis 120 and 122, with a polarizer to co-polarize the signals with respect to the target, may provide several advantages when compared to other similar antenna devices. For example, the size 108 of isolation area 106 may be reduced, yet maintain isolation to prevent interference between transmitted and received signals, which may reduce the overall size of the antenna. In some examples, a smaller antenna may allow device 100 to be used on a smaller vehicles, such as unmanned aerial vehicles (UAV). Other advantages may include that the improved isolation may be applied to increase the array size or transmit power of transmit array 104 without increasing the overall size of the radar and thereby achieve additional range from the radar.

Figure 2:
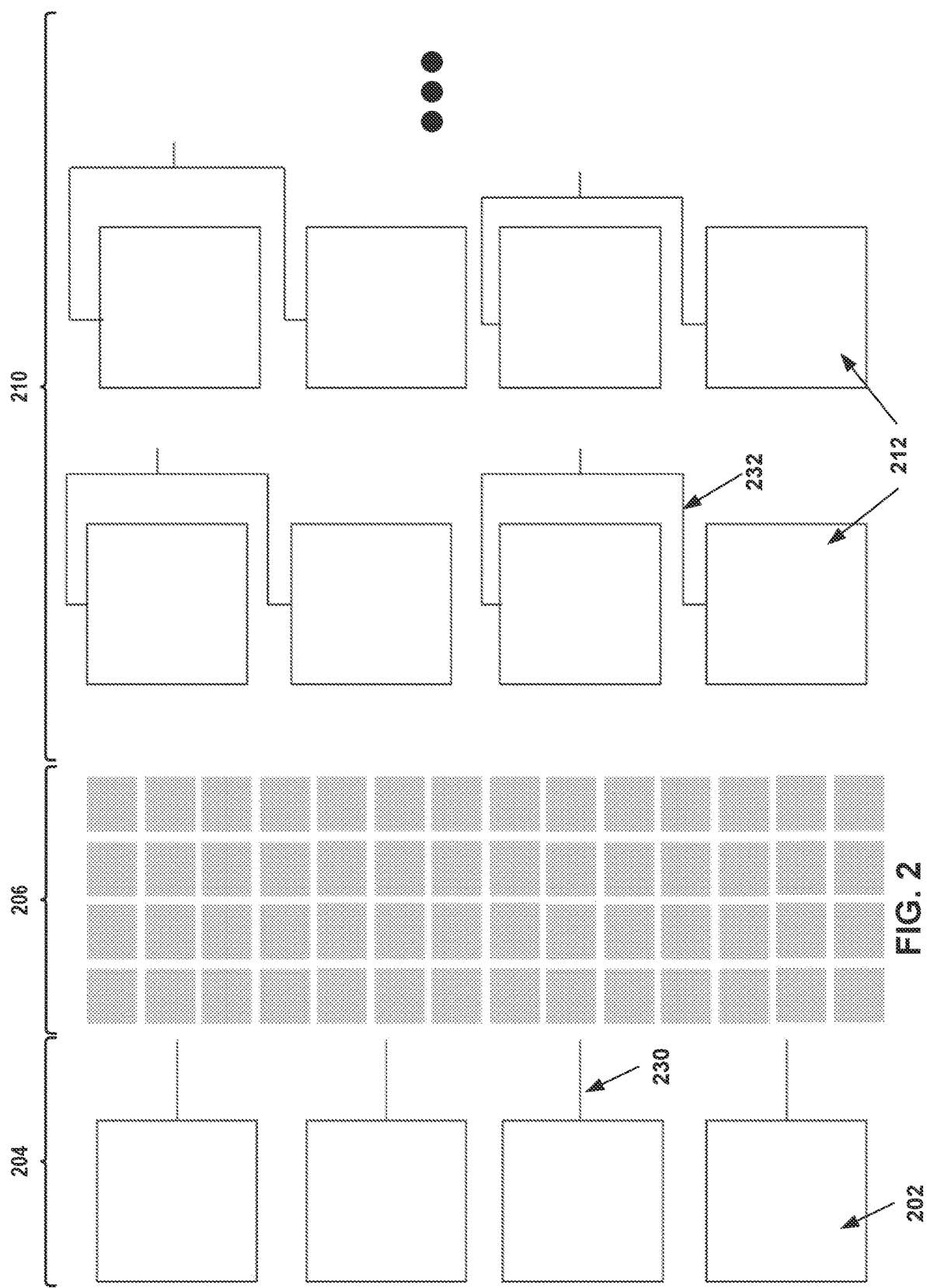
FIG. 2 is a conceptual diagram illustrating an example antenna with horizontally polarized transmit elements and vertically polarized receive elements.

FIG. 2 is a conceptual diagram illustrating an example antenna with horizontally polarized transmit elements and vertically polarized receive elements. In this disclosure, "horizontal" and "vertical" will be used with respect to the figure orientation, e.g., horizontal may be aligned with axis 120 and vertical may be aligned with axis 122 depicted above in FIG. 1. However, "horizontal" and "vertical" may depend on the orientation of the antenna with respect to the horizon as well on the mounting and application for the device. FIG. 2 depicts transmit antenna 204, isolation area 206, e.g., EBG 206 and receive array antenna 210.

In the example of FIG. 2, transmit elements 102 are patch elements. Transmit elements 202 may connect to the transmit electronics in the horizontal direction. In other words, connection 230, e.g., microstrip 230, may connect to transmit elements 202 from the transmit electronics along the right edge of each transmit element 202, as shown in the figure. The patch elements, e.g., 202 and 212 in the example of FIG. 2. are shown as square elements. However, in other examples, the transmit or receive elements of this disclosure may be any shape, such as round, oval, octagonal or other shapes.

Receive elements 212, in the example of FIG. 2, connect to the receive electronics in pairs. In other examples, each individual receive element 212 may connect to the receive electronics (not shown in FIG. 2). Connection 232, which may also be a microstrip, may connect from each of receive elements 212 to the receive electronics (not shown in FIG. 2) along the top edge of each receive element 212, as shown in the figure. In other examples, for the same connection orientation of connections 230 and transmit elements 202, each of receive elements 212 may connect to connection 232 from the bottom edge of each receive element 212.

Figure 3:
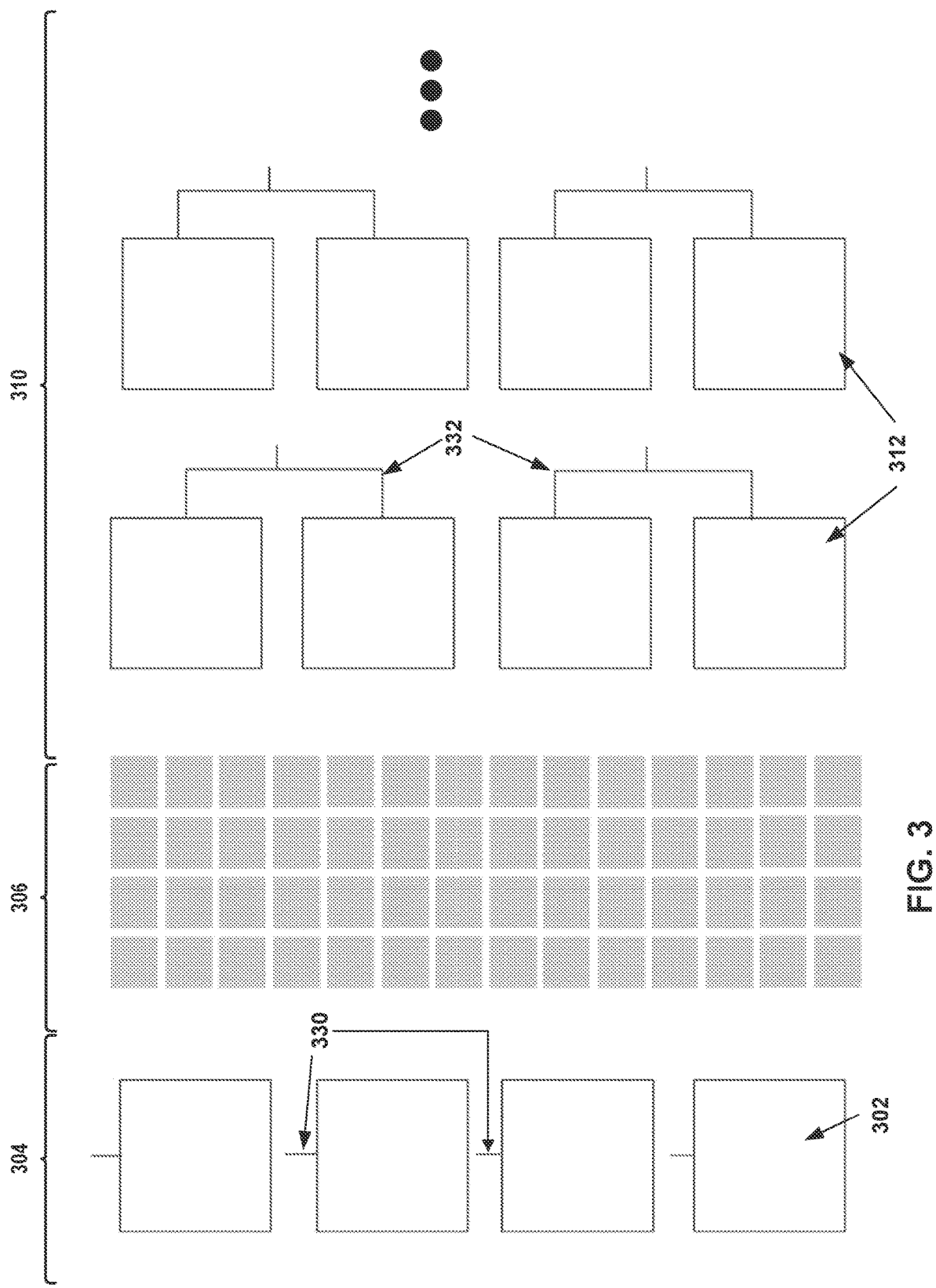
FIG. 3 is a conceptual diagram illustrating an example antenna with vertically polarized transmit elements and horizontally polarized receive elements.

FIG. 3 is a conceptual diagram illustrating an example antenna with vertically polarized transmit elements and horizontally polarized receive elements. FIG. 3 depicts transmit antenna 304, isolation area 306 and receive array antenna 310.

In the example of FIG. 3, transmit elements 302 are patch elements. Transmit elements 302 may connect to the transmit electronics in the vertical direction. In other words, connection 330, which may be a microstrip in some examples, may connect to transmit elements 302 from the transmit electronics along the top edge of each transmit element 302, as shown in the figure. In other examples of vertical polarization, connection 330 may also connect to the bottom edge of elements 302, as shown in FIG. 3.

Receive elements 312, in the example of FIG. 3, connect to the receive electronics in pairs. As described above in relation to FIG. 2, in other examples, each individual receive element 312 may connect to the receive electronics (not shown in FIG. 3). Connection 332, which may also be a microstrip, may connect from each of receive elements 312 to the receive electronics (not shown in FIG. 3) along the right edge of each receive element 312, as shown in the figure. In other examples, for the same connection orientation of connections 330 and transmit elements 302, each of receive elements 312 may connect to connection 332 from the left edge of each receive element 312.

Figure 4A:
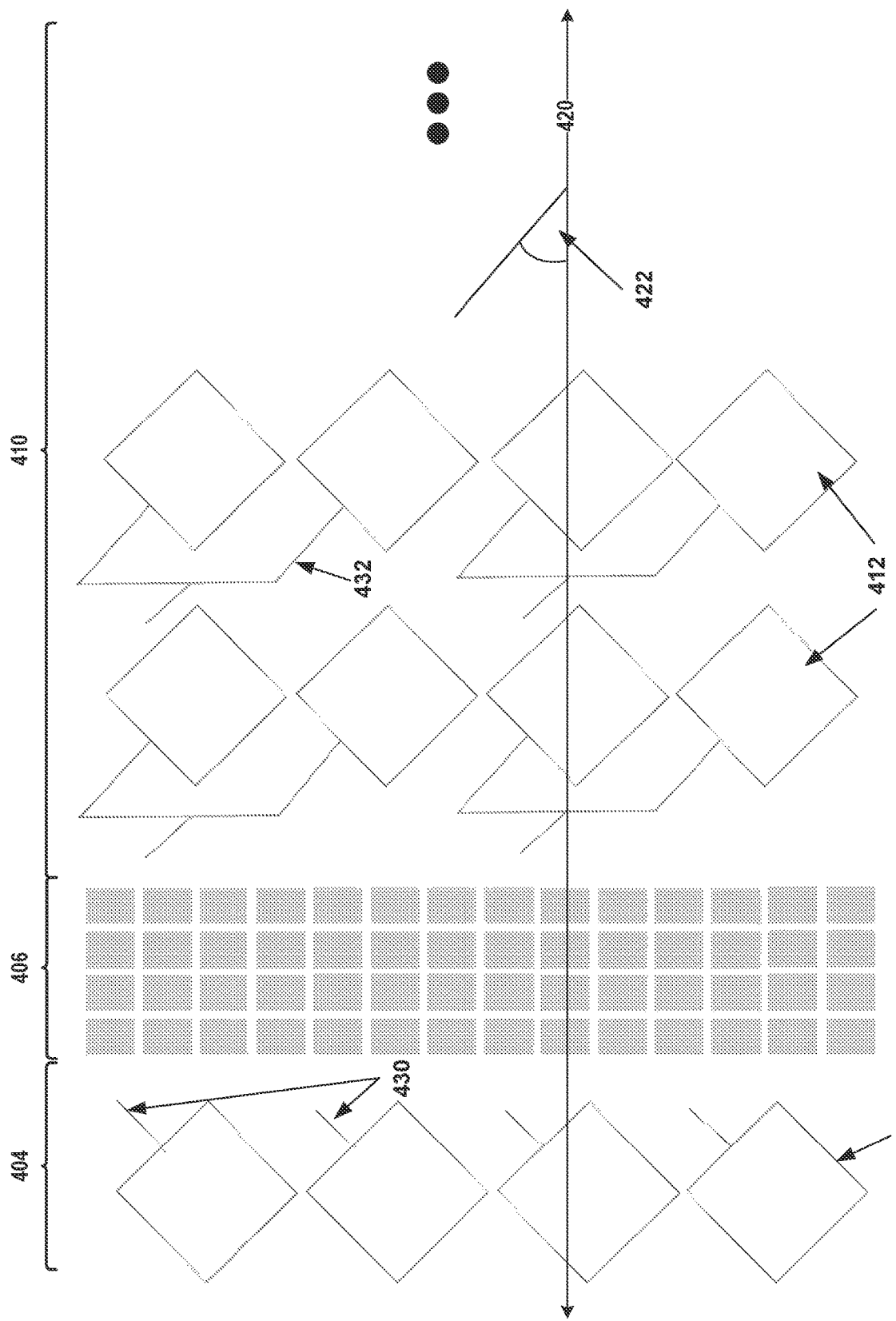
FIGS. 4A and 4B are conceptual diagrams illustrating an example antenna with transmit elements and receive elements polarized at an angle.
Figure 4B:
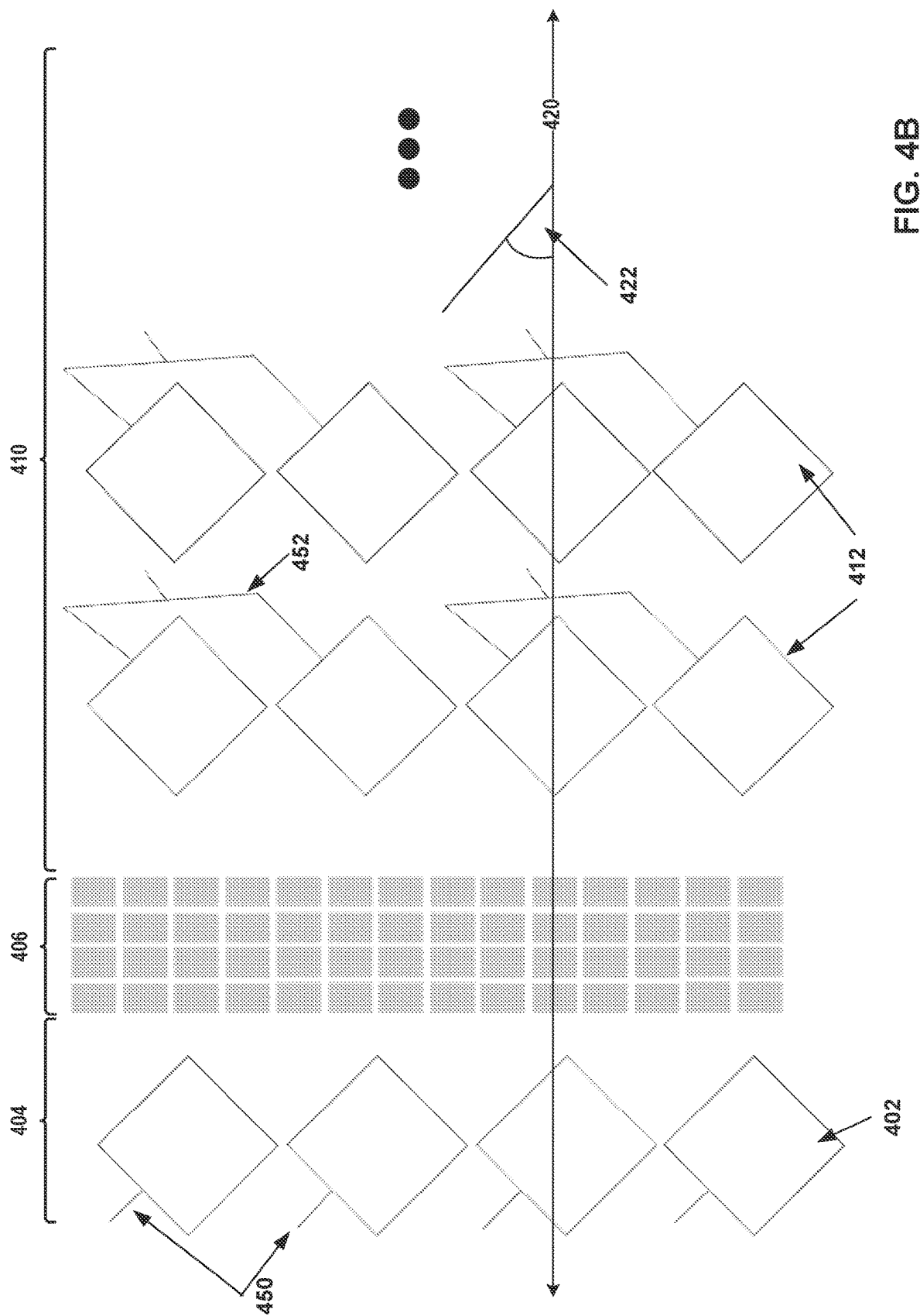

FIGS. 4A and 4B are conceptual diagrams illustrating an example antenna with transmit elements and horizontally receive elements polarized at an angle. In the example of FIG. 4A, receive elements 412 may be polarized at angle 422 relative to an axis 420 that approximately bisects transmit array 404 and receive array 410. Transmit elements 402 are polarized orthogonal to angle 422. The connections 432 to the receive electronics from receive elements 412 may coincide with angle 422. As described above in relation to FIG. 1, angle 422 may be any angle, such as 60°, 45°, 30° or some other angle. The connections 430 to the transmit electronics may be perpendicular to connections 432 to receive elements 412.

Similarly, in the example of FIG. 4B, transmit elements 402 may be polarized at angle 422 relative to an axis 420 that approximately bisects transmit array 404 and receive array 410. Receive elements 412 are polarized orthogonal to angle 422 in the example of FIG. 4B. The connections 452 to the receive electronics from receive elements 412 may be perpendicular to angle 422. The connections 450 to the transmit electronics may align with angle 422.

Figure 5A:
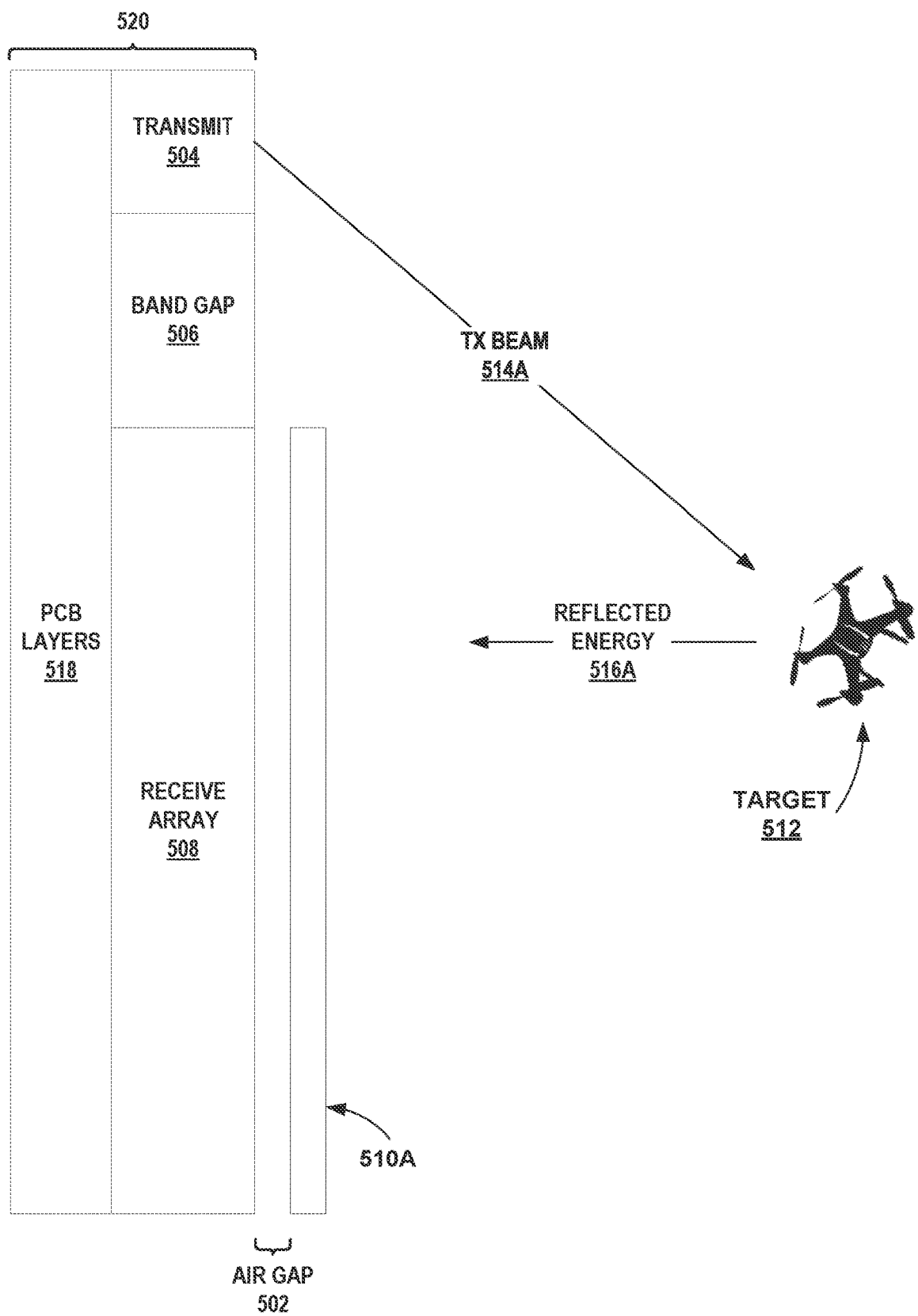
FIG. 5A is a conceptual diagram illustrating an example cross-polarized antenna with an orthogonal polarizer located at the receive array and including an air gap.

FIG. 5A is a conceptual diagram illustrating an example cross-polarized antenna with an orthogonal polarizer located at the receive array and including an air gap. As described above in relation to FIGS. 1-4B, the cross-polarized antenna may include transmit antenna 504, band gap 506, receive array antenna 508 and polarizer 510A. Transmit antenna 504, band gap 506, receive array antenna 508 are examples of the transmit antennae, received array antennae and isolation area 106 described above in relation to FIG. 1, as well as in FIGS. 2-4B in which the surface waves between transmit and receive antennas, which may cause interference, are cross polarized.

Transmit antenna 504, band gap 506, receive array antenna 508 may be part of an electromagnetic energy transmission and receive device 520 that includes additional printed circuit boards (PCB) and/or PCB layers 518 with other electronics, including power supply circuitry, signal processing circuitry and so on. In some examples, the other circuitry may be on PCBs separate from the PCB including transmit antenna 504, band gap 506, receive array antenna 508. In other examples, transmit antenna 504, band gap 506, receive array antenna 508 may be one or more layers of a multi-layer circuitry board that includes the transmit electronics, receive electronics and other signal processing circuitry. In some examples, the electromagnetic energy transmission and receive device may be an FMCW radar device.

In the example of FIG. 5A, polarizer 510A may be located between receive array antenna 508 and target 512 and has an air gap 502. In some examples polarizer 510A may be a separate PCB from receive array 508, and may still be mechanically and/or electrically connected to device 520.

In operation, transmit antenna 504 may output radar signals, e.g., in the high aspect ratio transmit beam 514A described above in relation to FIG. 1, which may reflect off target 512. The reflected radar signals 516A from target 512 may arrive at polarizer 510A and be polarized in the same direction as transmitted from transmit antenna 504. Polarizer 510A may be configured to receive reflected radar signals 516A from target 512 and output the received radar signals to receive array antenna 508 converted to an orthogonal polarization direction from the radar signals 516A received from target 512. In this manner, receive array antenna 508 may receive reflected radar signals 516A in the same polarization as the receive elements for receive array antenna 508.

Figure 5B:
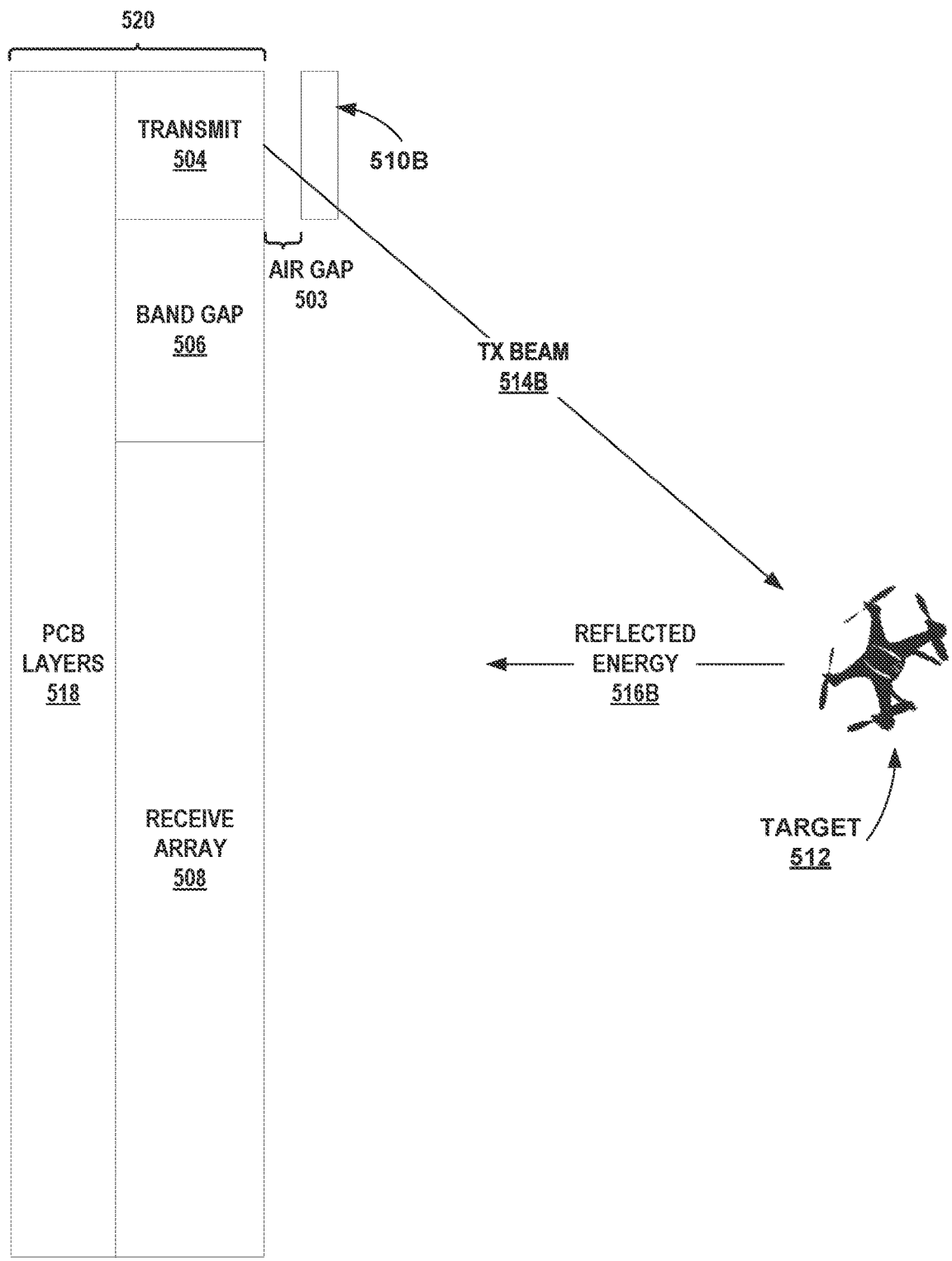
FIG. 5B is a conceptual diagram illustrating an example cross-polarized antenna with an orthogonal polarizer located at the transmit array and including an air gap.

FIG. 5B is a conceptual diagram illustrating an example cross-polarized antenna with an orthogonal polarizer located at the transmit array and including an air gap. As described above in relation to FIGS. 1-5A, the cross-polarized antenna may include transmit antenna 504, band gap 506, receive array antenna 508 and polarizer 510B. Transmit antenna 504, band gap 506, receive array antenna 508 and PCB layers 518 have the same functions and characteristics as described above in relation to FIG. 5A.

In the example of FIG. 5B, polarizer 510B may be located between transmit antenna 504 and target 512 and has an air gap 503. In some examples polarizer 510B may be a separate PCB from transmit antenna 504, and may still be mechanically and/or electrically connected to device 520.

In operation, transmit antenna 504 may output radar signals. Polarizer 510B may be configured to receive the radar signals from antenna 504 and output transmit beam (Tx beam) 514B, but converted to an orthogonal polarization to the transmission antenna elements of transmit antenna 504.

Receive array antenna 508 may receive reflected radar signals 516A from target 512, which are polarized in the same direction as the receive elements. In this manner, receive array antenna 508 may receive reflected radar signals 516B in the same polarization as the receive elements for receive array antenna 508.

Figure 5C:
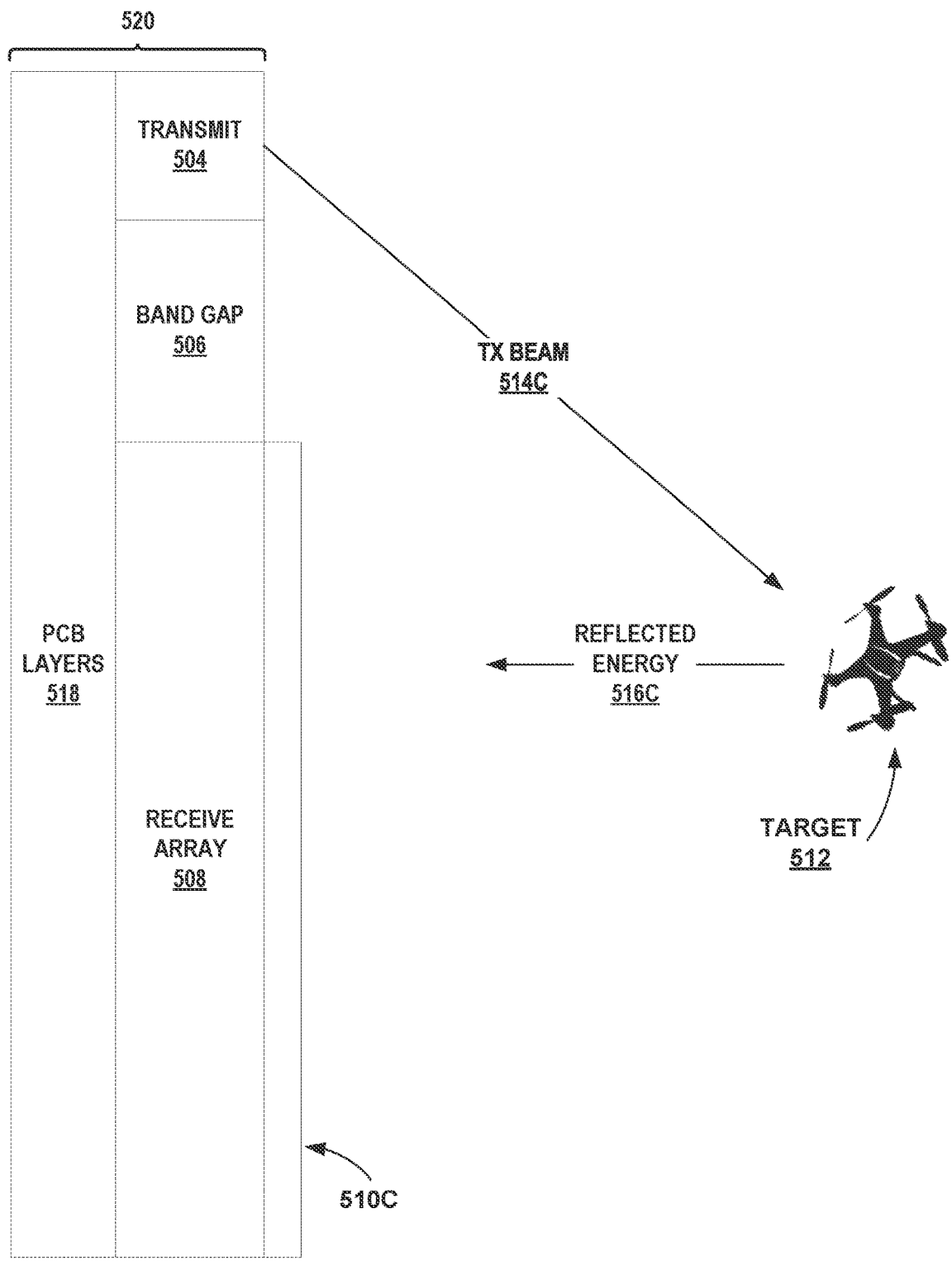
FIG. 5C is a conceptual diagram illustrating an example cross-polarized antenna with an orthogonal polarizer located at the receive array.
Figure 5D:
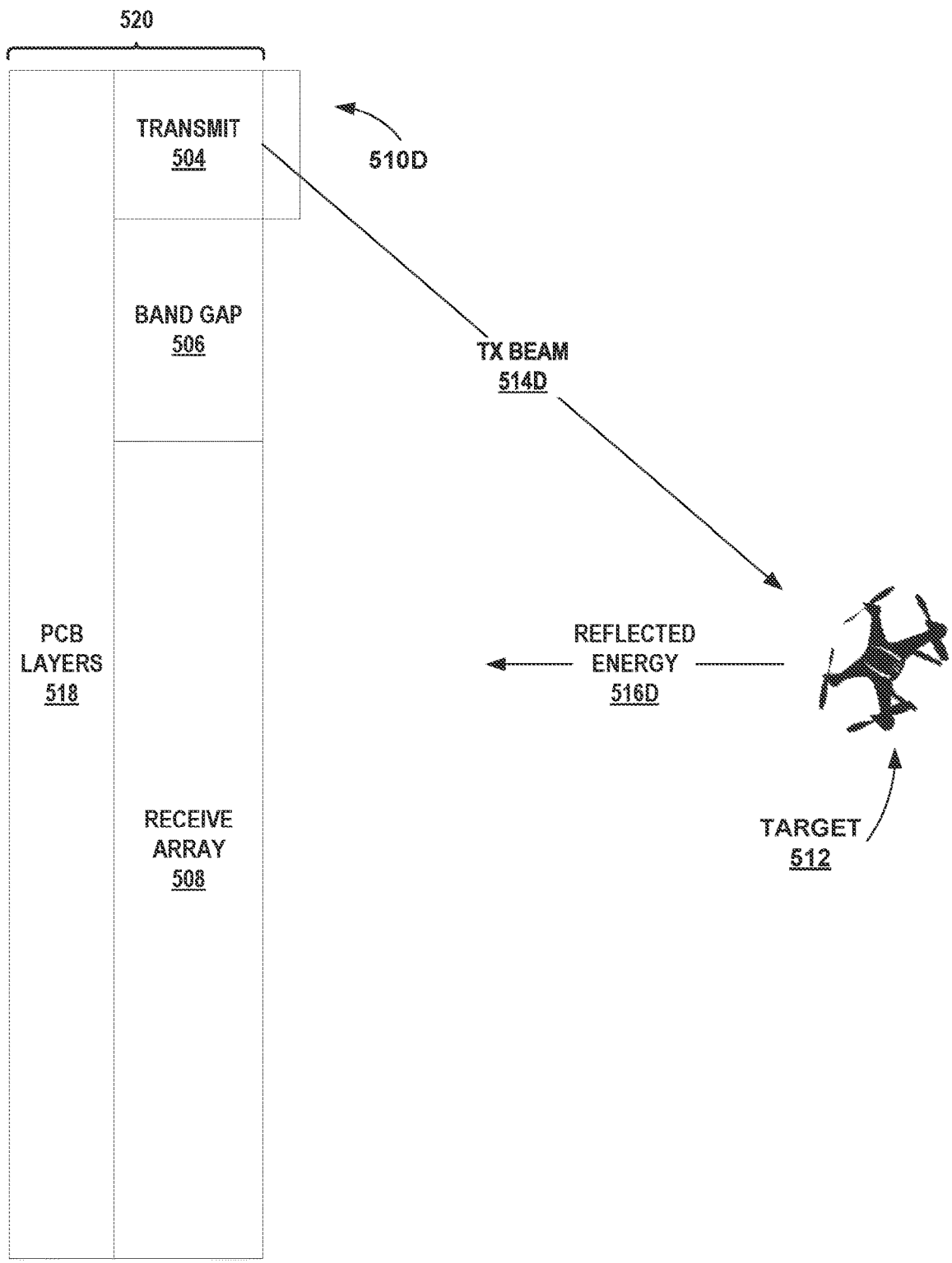
FIG. 5D is a conceptual diagram illustrating an example cross-polarized antenna with an orthogonal polarizer located at the transmit array.

FIG. 5C is a conceptual diagram illustrating an example cross-polarized antenna with an orthogonal polarizer located at the receive array. FIG. 5D is a conceptual diagram illustrating an example cross-polarized antenna with an orthogonal polarizer located at the transmit array. FIGS. 5C and 5D are, respectively, examples of FIGS. 5A and 5B, but do not include an air gap between the polarizer and the antenna. In some examples polarizer 510C and 510D may be implemented as a circuit board layer located between the respective antenna and target 512.

FIGS. 5C and 5D may have the same or similar functions and characteristics, respectively, as described above in relation to FIGS. 5A and 5B. In the example of FIG. 5C, transmit antenna 504 may output radar signals 514C which may reflect off target 512. The reflected radar signals 516C from target 512 may arrive at polarizer 510C and be polarized in the same direction as transmitted from transmit antenna 504. Polarizer 510C may be configured to receive reflected radar signals 516C from target 512 and output the received radar signals to receive array antenna 508 converted to an orthogonal polarization direction from the radar signals 516C received from target 512. In the example of FIG. 5D, transmit antenna 504 may output radar signals, as described above. Polarizer 510D may be configured to receive the radar signals from antenna 504 and output transmit beam (Tx beam) 514D, but converted to an orthogonal polarization to the transmission antenna elements of transmit antenna 504. Receive array antenna 508 may receive reflected radar signals 516D from target 512, which are polarized in the same direction as the receive elements.

Figure 6:
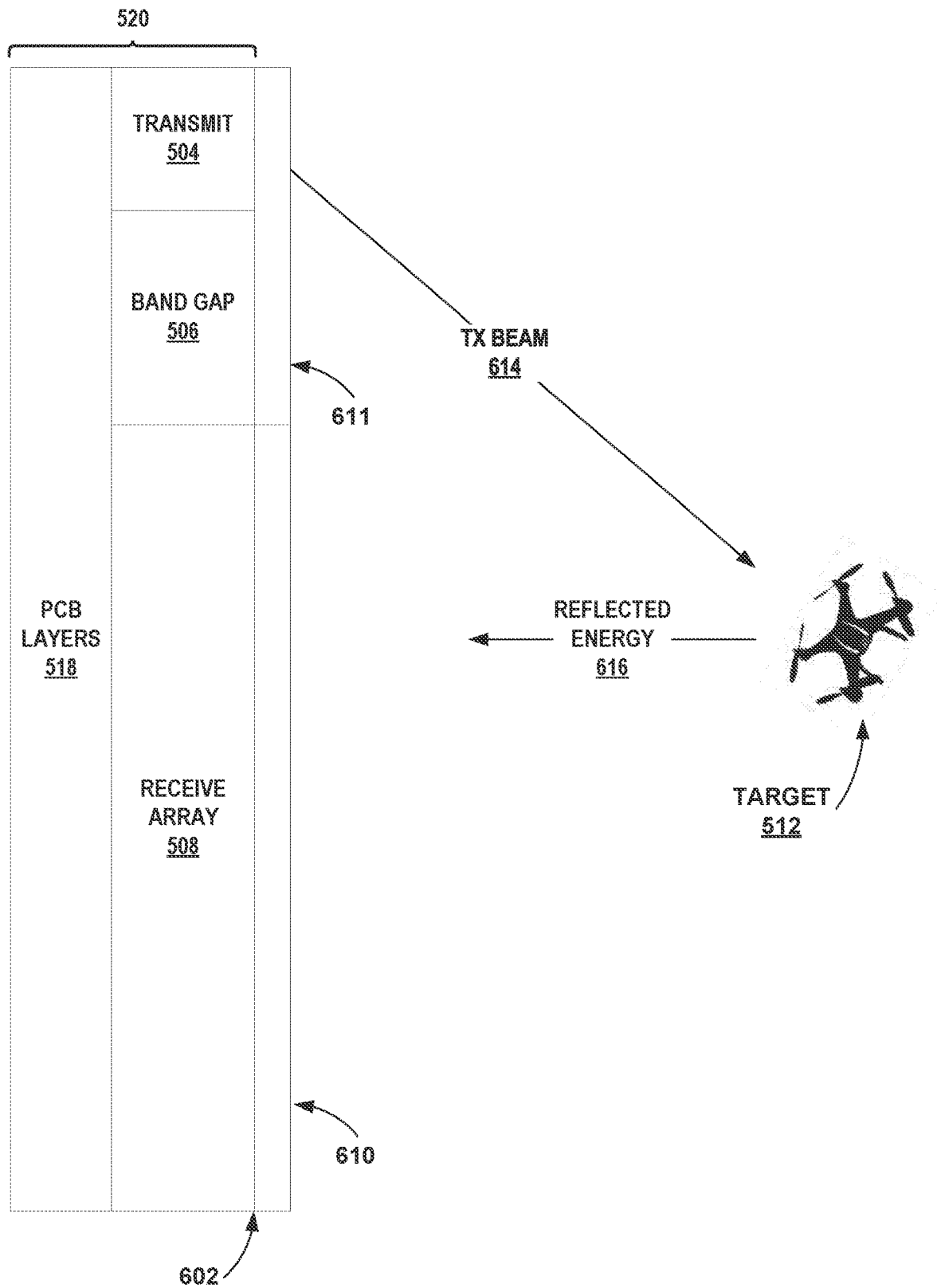
FIG. 6 is a conceptual diagram illustrating an example cross-polarized antenna with a circular polarization converter placed over the transmit antenna and a switchable left hand circular polarization (LHCP) and right hand circular polarization (RHCP) converter placed over the receive array antenna.

FIG. 6 is a conceptual diagram illustrating an example cross-polarized antenna with a circular polarization converter placed over the transmit antenna and a switchable left hand circular polarization (LHCP) and right hand circular polarization (RHCP) converter placed over the receive array antenna. In some examples the polarizer may be implemented using switchable components, such as pin diodes. The polarizer using pin diodes can turn on and off, which may create a short or open circuit for a specific signal path. A specific set of pin diodes turned on and other set turned off may provide one type of circular polarization, e.g., LHCP, while reversing the configuration may provide another type of polarization e.g., RHCP.

Transmit antenna 504, band gap 506, receive array antenna 508 and PCB layers 518 have the same functions and characteristics as described above in relation to FIG. 5A. In some examples, device 620 may include an air gap 602 between polarizers 610 and 611 and the respective antenna. In other examples, polarizers 610 and 611 may be implemented over transmit antenna 504 and receive array antenna 508 with no air gap.

In operation, transmit antenna 504 may output radar signals. In some examples, polarizer 611 may be configured to receive the radar signals from antenna 504 and output Tx beam 614, but converted to an LHCP polarization. In other examples, polarizer 611 may be configured to receive the radar signals from antenna 504 and output Tx beam 614, but converted to an RHCP polarization. The reflected radar signals 616 from target 512 may arrive at polarizer 610, which is a switchable LHCP/RHCP converter, with an axial ratio of less than 3 dB. Polarizer 610 may be configured to receive reflected radar signals 616 from target 512 and output the received radar signals to receive array antenna 508 converted to the same polarization as the receive elements for receive array antenna 508.

Figure 7:
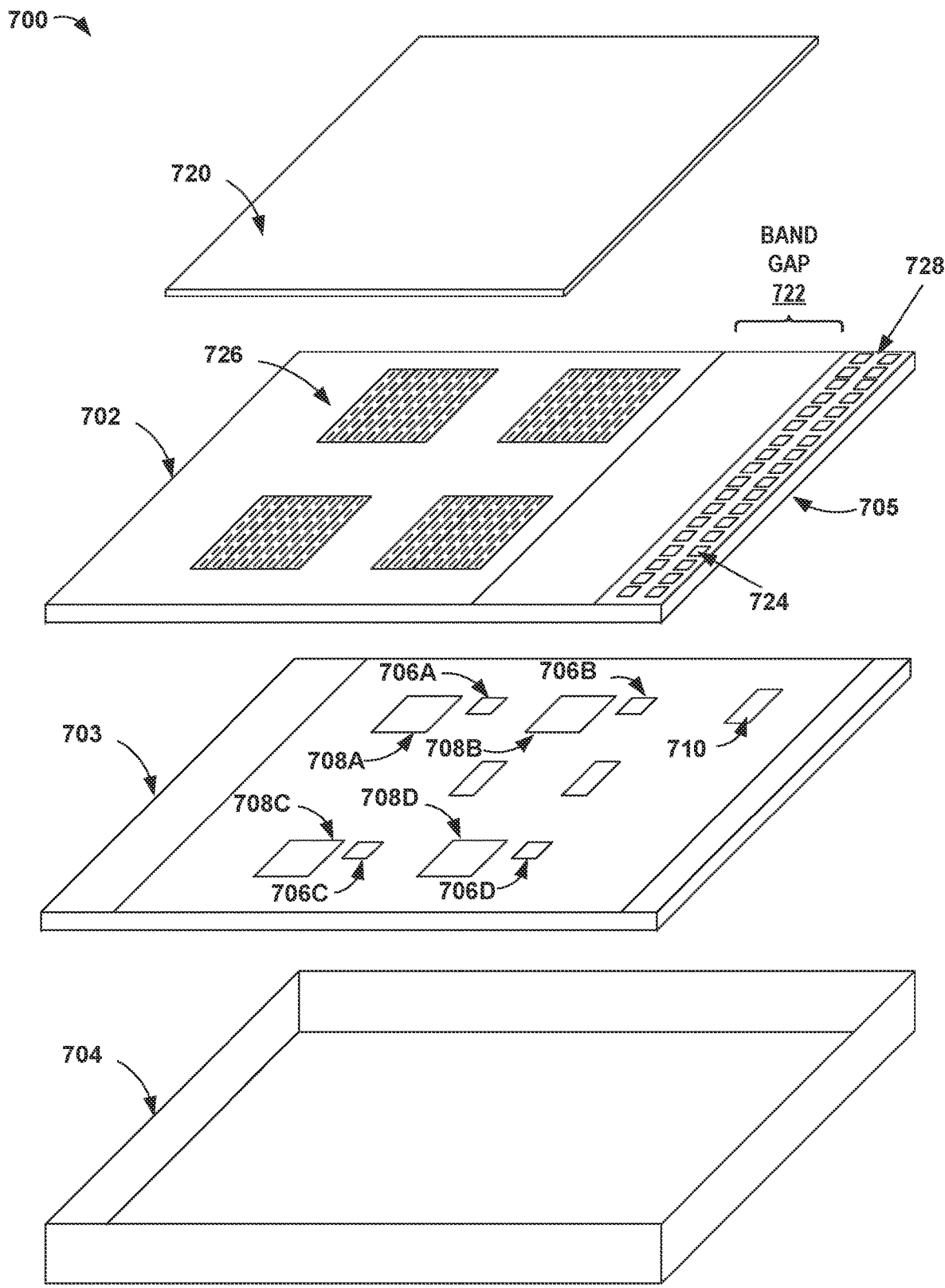
FIG. 7 is a conceptual diagram illustrating an exploded view of an example integrated radar system including a multi-layer circuit board in accordance with one or more techniques of this disclosure.

FIG. 7 is a conceptual diagram illustrating an exploded view of an example integrated radar system including a multi-layer circuit board in accordance with one or more techniques of this disclosure. In the example of FIG. 7, integrated radar system 700 is implemented as a multi-layer printed circuit board (PCB) 701 that may include antenna layer 702 and one or more circuit layers 703. FIG. 7 illustrates an example radar system which may include antenna such as device 100 described above in relation to FIG. 1. Similarly, in some examples, antenna layer 702 may be configured as any of the antennae described above in relation to FIGS. 2-6. In some examples, circuit layers 703 may be an example of PCB layers 518 described above in relation to FIG. 5A.

Antenna layer 702 may include a radiation layer and feed network layer 705 (not visible in FIG. 7). As described above in relation to FIGS. 1-6, antenna layer 702 may include band gap 722, receive array antenna 726, and transmit antenna 728 with transmit elements 724. In the example of FIG. 7, transmit antenna 728 includes two columns of transmit elements 724. In other examples, e.g., as described above in relation to FIG. 1, transmit antenna 728 may include a single column of transmit elements. In the example of FIG. 7, polarizer 720 is located over receive array antenna 726, e.g., between receive array antenna 726 and a target (not shown in FIG. 7). However, in other examples, polarizer 720 may be located over transmit antenna 728, or over both transmit antenna 728 and receive array antenna 726, in the example of a RHCP and/or LHCP polarization configuration, described above in relation to FIG. 6.

Circuit layers 703 may include signal processing circuitry comprising transmit electronics and receiver electronics. For example, receiver electronics may include receiver circuitry, such as receiver circuits 708A-708D, analog-to-digital (A/D) converters 706A-706D as well as other circuit elements. An analog-to-digital converter may also be called an "ADC." Though shown as a single PCB in the example of FIG. 7, system 700 may include two or more PCBs (not shown in FIG. 7) such as a power supply board, communications board, and other circuit boards operatively coupled together to form system 700.

Multi-layer PCB 701 may include circuits and components that implement radar transmitter electronics, radar receiver electronics, one or more processors 710, communication electronics, power conditioning and distribution, clock/timers and other circuitry and components. The one or more processors 710 may be configured to control the radar transmitter electronics and radar receiver electronics as well as process and identify radar targets and send notifications and information to users using the communication electronics. A processor may include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Antenna layer 702 may be electrically connected to circuit paths and components on one or more circuit layers 703 via transmitter and receiver feed networks, such as connections 230 and 232 described above in relation to FIG. 2. In some examples, plated vias may provide connections between one or more circuit layers 703, as well as to antenna layer 702. A via may be a plated or un-plated hole that may be drilled, etched, or otherwise formed between layers of multi-layer PCB 701. A plated via may be plated with a conductive material to electrically connect layers. Some examples of conductive material may include copper, solder, conductive epoxy, or other materials.

Protective shield 704 may cover and provide structural support for example integrated radar system 700. Protective shield 704 may be a molded plastic, stamped or formed sheet metal or other suitable material. Protective shield 704 may include a conductive coating in one or more areas to provide shielding for electromagnetic interference (EMI). Protective shield 704 may include penetrations for power, communication or other connections as well as be configured to securely mount integrated radar system 700. Though depicted as rectangular in the example of FIG. 7, the multi-layer circuit board, and protective shield 704, may be any shape, including round, oval, octagonal, and so on.

Figure 8:
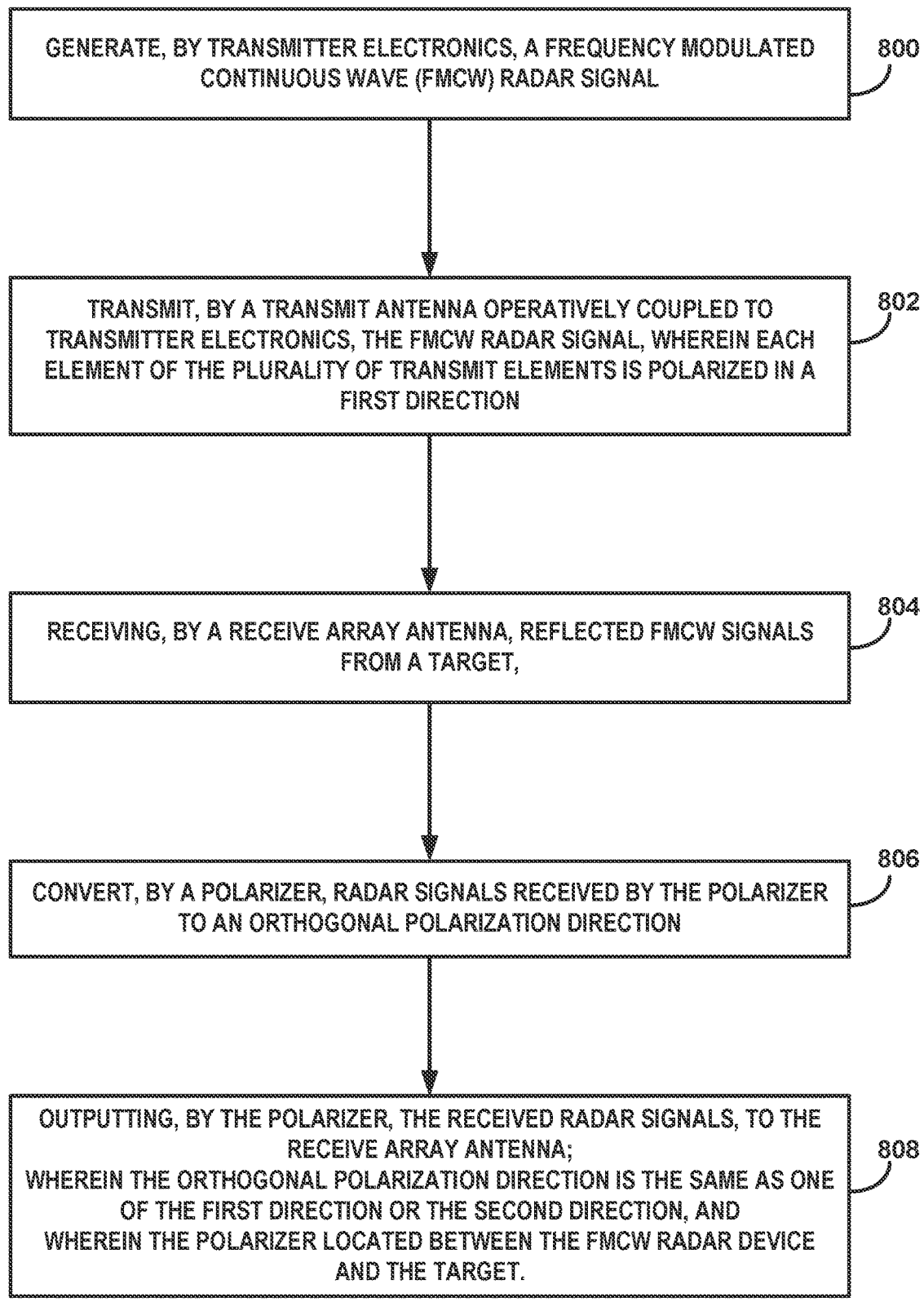
FIG. 8 is a flow chart illustrating an example mode of operation of a cross-polarized antenna of this disclosure

FIG. 8 is a flow chart illustrating an example mode of operation of a cross-polarized antenna of this disclosure. As seen in the example of FIG. 8, transmitter electronics of a radar system, such as circuitry on circuit layer 703 of radar system 700 shown in FIG. 7 or electromagnetic energy transmission and receive device 520 shown in FIG. 5A may generate a frequency modulated continuous wave radar signal (800).

The radar system may transmit, e.g., by transmit antenna 504 operatively coupled to transmitter electronics, the FMCW radar signal. As described above in relation to FIGS. 1-6, the transmit antenna may include a plurality of transmit antenna elements with each element of the plurality of transmit elements is polarized in a first direction (802).

The receive array antenna, e.g., receive array antenna 508, may receive reflected FMCW signals transmitted by the transmit antenna from target 512, as shown in FIGS. 5A-5D (804). As described above for FIGS. 1-6, each element of the of receive elements may be polarized in a second direction orthogonal to the first direction. Therefore, a polarizer, such as polarizer 510A, 510B, 510C or 510D located between the radar system and target 512 may convert radar signals received by the polarizer to an orthogonal polarization direction (806) and output the received radar signals (808).

The techniques of this disclosure may also be described in the following examples.

Example 1: A frequency modulated continuous wave (FMCW) radar device comprising: a transmit antenna comprising: a plurality of transmit antenna elements aligned in a single column, wherein each element of the plurality of transmit elements is polarized in a first direction; a receive array antenna separate from the transmit antenna, comprising an array of receive elements, wherein the receive array antenna is configured to receive reflected FMCW signals transmitted by the transmit antenna from a target, wherein each element of the plurality of receive elements is polarized in a second direction orthogonal to the first direction; and a polarizer, located between the FMCW radar device and the target; electrically and mechanically connected to the FMCW radar device; and the polarizer configured to receive radar signals and output the received radar signals converted to an orthogonal polarization direction, wherein the orthogonal polarization direction is the same as one of the first direction or the second direction.

Example 2: The device of example 1, further comprising an air gap between the polarizer and the FMCW radar device.

Example 3: The device of any of examples 1 and 2, wherein the polarizer is located between the transmit antenna and the target; and wherein the polarizer is configured to receive radar signals from the transmit antenna and output the received radar signals to the target converted to an orthogonal polarization direction from the radar signals received from the transmit antenna.

Example 4: The device of any of examples 1 through 3, wherein the polarizer is located between the receive array antenna and the target; and wherein the polarizer is configured to receive radar signals from the target and output the received radar signals to the receive array antenna converted to an orthogonal polarization direction from the radar signals received from the target.

Example 5: The device of any of examples 1 through 4, wherein the polarizer is configured with an insertion loss of less than 1.0 dB.

Example 6: The device of any of examples 1 through 5, wherein the polarizer is implemented as a circuit board, separate from the transmit antenna and the receive antenna.

Example 7: The device of any of examples 1 through 6, wherein the polarizer is implemented as a circuit board layer.

Example 8: A system comprising: signal processing circuitry comprising: a transmit antenna comprising: a plurality of transmit antenna elements aligned in a single column, wherein each element of the plurality of transmit elements is polarized in a first direction; a receive array antenna separate from the transmit antenna, comprising an array of receive elements, wherein the receive array antenna is configured to receive reflected FMCW signals transmitted by the transmit antenna from a target, wherein each element of the plurality of receive elements is polarized in a second direction orthogonal to the first direction; and a polarizer, located between the FMCW radar device and the target; electrically and mechanically connected to the FMCW radar device; and the polarizer configured to receive radar signals and output the received radar signals converted to an orthogonal polarization direction, wherein the orthogonal polarization direction is the same as one of the first direction or the second direction.

Example 9: The system of example 8, further comprising an air gap between the polarizer and the FMCW radar device.

Example 10: The system of any of examples 8 and 9, wherein the polarizer is located between the transmit antenna and the target; and wherein the polarizer is configured to receive radar signals from the transmit antenna and output the received radar signals to the target converted to an orthogonal polarization direction from the radar signals received from the transmit antenna.

Example 11: The system of any of examples 8 through 10, wherein the polarizer is located between the receive array antenna and the target; and wherein the polarizer is configured to receive radar signals from the target and output the received radar signals to the receive array antenna converted to an orthogonal polarization direction from the radar signals received from the target.

Example 12: The system of any of examples 8 through 11, wherein the polarizer is configured with an insertion loss of less than 1.0 dB.

Example 13: The system of any of examples 8 through 12, wherein the polarizer is implemented as a circuit board, separate from the transmit antenna and the receive antenna.

Example 14: The system of any of examples 8 through 13, wherein the polarizer is implemented as a circuit board layer.

Example 15: A method comprising: generating, by transmitter electronics, a frequency modulated continuous wave (FMCW) radar signal; transmitting, by a transmit antenna operatively coupled to transmitter electronics, the FMCW radar signal, wherein the transmit antenna comprises a plurality of transmit antenna elements aligned in a single column, wherein each element of the plurality of transmit elements is polarized in a first direction; receiving, by a receive array antenna, reflected FMCW signals from a target, wherein the reflected FMCW signals were transmitted to the target by the transmit antenna, wherein the receive array antenna comprises a plurality of receive elements arranged in an array of receive elements, and wherein each element of the plurality of receive elements is polarized in a second direction orthogonal to the first direction; converting, by a polarizer, radar signals received by the polarizer to an orthogonal polarization direction; and outputting, by the polarizer, the received radar signals, wherein the orthogonal polarization direction is the same as one of the first direction or the second direction, and wherein the polarizer located between the FMCW radar device and the target.

Example 16: The method of example 15, wherein the polarizer is located between the transmit antenna and the target; and wherein the polarizer is configured to receive radar signals from the transmit antenna and output the received radar signals to the target converted to an orthogonal polarization direction from the radar signals received from the transmit antenna.

Example 17: The method of any of examples 15 and 16, wherein the polarizer is located between the receive array antenna and the target; and wherein the polarizer is configured to receive radar signals from the target and output the received radar signals to the receive array antenna converted to an orthogonal polarization direction from the radar signals received from the target.

Example 18: The method of any of examples 15 through 17, wherein the polarizer is configured with an insertion loss of less than 1.0 dB.

Example 19: The method of any of examples 15 through 18, wherein the polarizer is implemented as a circuit board, separate from the transmit antenna and the receive antenna.

In one or more examples, the functions described above may be implemented in hardware, software, firmware, or any combination thereof. For example, the various components of FIGS. 1-7, such as the circuitry on layer 703 of FIG. 7 and on the PCB layers 518 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" and "processing circuitry," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

What is claimed is:
1. A frequency modulated continuous wave (FMCW) radar device, the device comprising:
   a transmit antenna comprising:
      a plurality of transmit antenna elements aligned in a single column, wherein each element of the plurality of transmit antenna elements is polarized in a first direction;

a receive array antenna separate from the transmit antenna, comprising a plurality of receive elements,
wherein the receive array antenna is configured to receive reflected FMCW signals, transmitted by the transmit antenna, from a target,
wherein each element of the plurality of receive elements is polarized in a second direction orthogonal to the first direction; and
a polarizer,
located between the FMCW radar device and the target;
electrically and mechanically connected to the FMCW radar device; and
the polarizer configured to receive radar signals and output the received radar signals converted to an orthogonal polarization direction, wherein the orthogonal polarization direction is the same as one of the first direction or the second direction.

2. The device of claim 1, further comprising an air gap between the polarizer and the FMCW radar device.

3. The device of claim 1,
wherein the polarizer is located between the transmit antenna and the target; and
wherein the polarizer is configured to receive radar signals from the transmit antenna and output the received radar signals to the target converted to an orthogonal polarization direction from the radar signals received from the transmit antenna.

4. The device of claim 1,
wherein the polarizer is located between the receive array antenna and the target; and
wherein the polarizer is configured to receive radar signals from the target and output the received radar signals to the receive array antenna converted to an orthogonal polarization direction from the radar signals received from the target.

5. The device of claim 1, wherein the polarizer is configured with an insertion loss of less than 1.0 dB.

6. The device of claim 1, wherein the polarizer is implemented as a circuit board, separate from the transmit antenna and the receive array antenna.

7. The device of claim 1, wherein the polarizer is implemented as a circuit board layer.

8. A system comprising:
signal processing circuitry comprising transmit electronics and receiver electronics; and
a frequency modulated continuous wave (FMCW) radar device, the device comprising:
a transmit antenna comprising:
a plurality of transmit antenna elements aligned in a single column, wherein each element of the plurality of transmit antenna elements is polarized in a first direction;
a receive array antenna separate from the transmit antenna, comprising a plurality of receive elements,
wherein the receive array antenna is configured to receive reflected FMCW signals, transmitted by the transmit antenna, from a target,
wherein each element of the plurality of receive elements is polarized in a second direction orthogonal to the first direction; and
a polarizer,
located between the FMCW radar device and the target;
electrically and mechanically connected to the FMCW radar device; and
the polarizer configured to receive radar signals and output the received radar signals converted to an orthogonal polarization direction, wherein the orthogonal polarization direction is the same as one of the first direction or the second direction.

9. The system of claim 8, further comprising an air gap between the polarizer and the FMCW radar device.

10. The system of claim 8,
wherein the polarizer is located between the transmit antenna and the target; and
wherein the polarizer is configured to receive radar signals from the transmit antenna and output the received radar signals to the target converted to an orthogonal polarization direction from the radar signals received from the transmit antenna.

11. The system of claim 8,
wherein the polarizer is located between the receive array antenna and the target; and
wherein the polarizer is configured to receive radar signals from the target and output the received radar signals to the receive array antenna converted to an orthogonal polarization direction from the radar signals received from the target.

12. The system of claim 8, wherein the polarizer is configured with an insertion loss of less than 1.0 dB.

13. The system of claim 8, wherein the polarizer is implemented as a circuit board, separate from the transmit antenna and the receive array antenna.

14. The system of claim 8, wherein the polarizer is implemented as a circuit board layer.

15. A method comprising:
generating, by transmitter electronics of a frequency modulated continuous wave (FMCW) radar device, an FMCW radar signal;
transmitting, by a transmit antenna operatively coupled to the transmitter electronics, the FMCW radar signal, wherein the transmit antenna comprises a plurality of transmit antenna elements aligned in a single column, wherein each element of the plurality of transmit antenna elements is polarized in a first direction;
receiving, by a receive array antenna, reflected FMCW signals from a target,
wherein the reflected FMCW signals were transmitted to the target by the transmit antenna,
wherein the receive array antenna comprises a plurality of receive elements arranged in an array of receive elements, and
wherein each element of the plurality of receive elements is polarized in a second direction orthogonal to the first direction;
converting, by a polarizer, radar signals received by the polarizer to an orthogonal polarization direction; and
outputting, by the polarizer, the received radar signals,
wherein the orthogonal polarization direction is the same as one of the first direction or the second direction, and
wherein the polarizer is located between the FMCW radar device and the target.

16. The method of claim 15,
wherein the polarizer is located between the transmit antenna and the target; and
wherein the polarizer is configured to receive radar signals from the transmit antenna and output the received radar signals to the target converted to an orthogonal polarization direction from the radar signals received from the transmit antenna.

17. The method of claim 15,
wherein the polarizer is located between the receive array antenna and the target; and wherein the polarizer is configured to receive radar signals from the target and output the received radar signals to the receive array antenna converted to an orthogonal polarization direction from the radar signals received from the target.

18. The method of claim 15, wherein the polarizer is configured with an insertion loss of less than 1.0 dB.

19. The method of claim 15, wherein the polarizer is implemented as a circuit board, separate from the transmit antenna and the receive array antenna.

20. The method of claim 15, wherein the polarizer is implemented as a circuit board layer.

* * * * *